March 13, 1928.

R. G. AREY 1,662,290

WIPING ELEMENT FOR WINDSHIELD CLEANERS

Filed Dec. 3, 1923

Inventor:—
Ralph G. Arey
Owen W. Kennedy
Attorney

Patented Mar. 13, 1928.

1,662,290

UNITED STATES PATENT OFFICE.

RALPH G. AREY, OF WORCESTER, MASSACHUSETTS, ASSIGNOR TO WORCESTER BILT-RITE COMPANY, OF WORCESTER, MASSACHUSETTS, A CORPORATION OF MASSACHUSETTS.

WIPING ELEMENT FOR WINDSHIELD CLEANERS.

Application filed December 3, 1923. Serial No. 678,245.

My invention relates to windshield cleaners and has particular reference to an improved form of wiping element that is adapted to be employed in connection with a suitable actuating mechanism to remove rain, snow, and other similar matter, from the face of the windshield, and thus provide a clear space through which the driver of an automobile, or other vehicle, can readily see.

The present invention contemplates a wiping element that is composed of a transparent material, so that when the element is moving back and forth on the windshield, it is scarcely visible to the driver of the vehicle, and thus will interfere with his vision much less than wiping elements composed of opaque material. My invention further contemplates a wiping element which is extremely simple and inexpensive in construction, the parts of the wiping element proper being readily applied to, or removable from my improved holder, which is adjustable so as to receive different lengths of elements. My invention further contemplates improved means for securing the element and its holder to the oscillating shaft of the actuating mechanism, all as will hereinafter more fully appear, reference being had to the accompanying drawings in which, Fig. 1 is a view in front elevation of a portion of a windshield, having a cleaner mechanism mounted thereon provided with a wiping element embodying my invention.

Like reference characters refer to like parts in the different figures.

Figures 1, 3, 4:
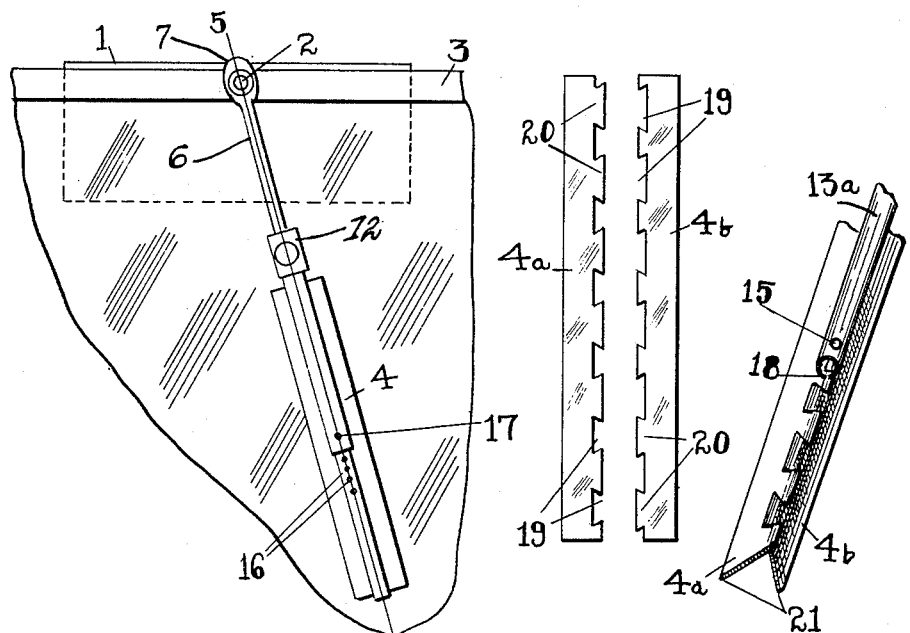
Fig. 3 is a view illustrating the parts of my wiping element before being assembled.
Fig. 4 is a perspective view illustrating the parts of the element assembled and partly applied to my improved holder.
Figure 2:
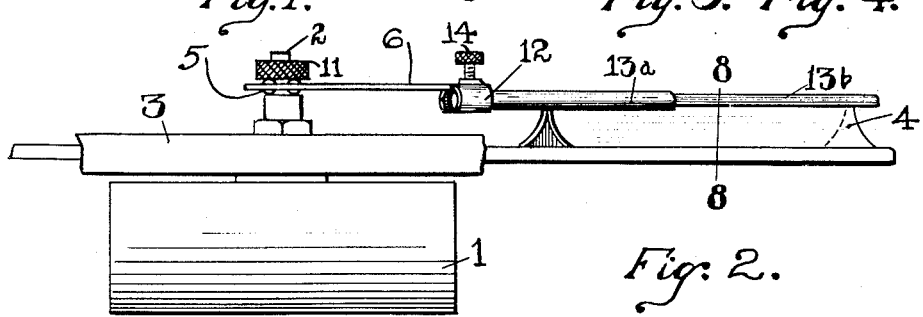
Fig. 2 is a plan view of the parts shown in Fig. 1, with the wiping element moved to an extreme upper position.

Referring first to Figs. 1 and 2, my improved wiping element is shown in connection with a suitable operating mechanism that is enclosed within a casing 1, through which projects a shaft 2 to which is imparted an oscillatory movement by mechanism enclosed within the casing 1. The casing 1 is secured to the frame 3 of the windshield and the shaft 2 extends through, and beyond the frame 3. My improved wiping element is generally designated by the reference numeral 4, and is adapted to be moved back and forth over the front face of the windshield glass by reason of its connection to the shaft 2, which will now be described.

Figures 6, 8:
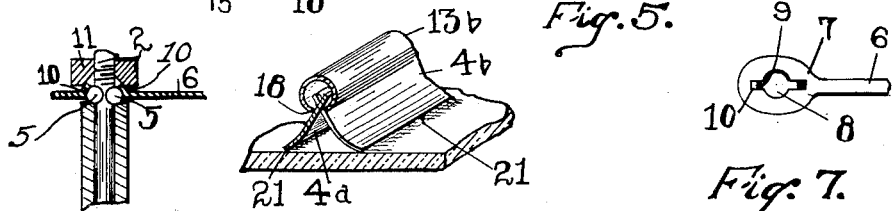
Fig. 6 is an enlarged sectional view of a portion of the parts shown in Fig. 2.
Fig. 8 is a sectional view along the line 8—8 of Fig. 2, partly in perspective.
Figure 7:
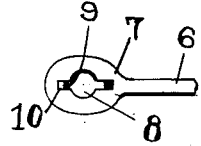
Fig. 7 is a detail view of the wiper rod.

As best shown in Figs. 2 and 6, the end portion of the shaft 2 is provided with a pair of ears 5 suitably formed by pinching the shaft at diametrically opposite points. A holder rod 6 is provided with an enlarged head 7, see Fig. 7, which is provided with a circular opening 8 slightly greater in diameter than the shaft 2. The metal around the opening 8 is punched at diametrically opposite points to provide notches 9 of substantially the same depth as the ears 5 on the shaft 2. The metal which is punched out to provide the notches 9 is not removed from the head 7, but is bent away from the plane of the head 7 at an angle of about 45° to provide wings 10. The rod 6 is adapted to be attached to the shaft 2 by positioning the end of the shaft in the opening 8 and moving the head 7 along the shaft until the ears 5 coincide with the notches 9. It is obvious that when the ears 5 engage the wings 10, the head 7 cannot be moved any farther along the shaft 2. In order to secure the head 7 of the rod 6 firmly in position on the shaft, a nut 11 having a concave face is screwed onto the threaded end of the shaft 2 until it engages the wings 10, which are then forced in to close engagement with the ears 5. With this arrangement, it is obvious that the holder rod 6 can be readily secured to the shaft 2, and can also be readily removed therefrom by merely unscrewing the nut 11.

The rod 6 terminates in an enlarged cylindrical portion 12 which is adapted to receive an adjustable holder which carries the wiping element 4. The holder is made in two sections 13$^a$ and 13$^b$, each tubular in form, the section 13$^b$ being smaller than the section 13$^a$, so that it is adapted to telescope therein. One end of the holder section 13$^a$ is adapted to be received in the enlarged portion 12 of the rod 6, and a set screw 14, extending through the portion 12, is received in an opening 15 provided in the holder section 13$^a$, thereby holding it in position.

Figure 5:
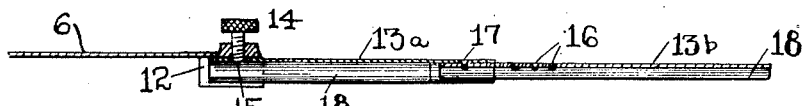
Fig. 5 is a longitudinal sectional view along the line 5—5 of Fig. 1.

As previously stated, the holder section 13$^b$ is telescopic within the holder section 13$^a$, and as best shown in Fig. 5, is provided with a plurality of spaced openings 16 near the end which is received in the section 13$^a$. The section 13$^a$ is provided with an inwardly extending projection 17 which is adapted to be received in any one of the openings 16 in order to lock the sections 13$^a$ and 13$^b$ in position. With the above described adjustment, it is apparent that the overall length of the holder can be readily varied for wiping elements of different lengths, and in order to receive such an element, the sections 13$^a$ and 13$^b$ are each provided with a slot 18 extending the length thereof, which slots 18 are in alinement when the projection 17 is received in a hole 16.

Referring now to Figs. 3 and 4, there is illustrated my improved wiping element, heretofore designated by the reference numeral 4. The wiping element is made in two parts, 4$^a$ and 4$^b$, each part being similar in all respects to the other part. The parts of the wiping element are preferably composed of flexible transparent material, such as celluloid, or other composition having similar properties, each part being stamped from a thin sheet of the material. The parts 4$^a$ and 4$^b$ are each provided along one edge with a series of notches 19 and projections 20 dovetailed in form so that when the part 4$^b$ is reversed with respect to the part 4$^a$, the projections 20 of the part 4$^a$ substantially register with the notches 19 of the part 4$^b$. The above described relation is clearly shown in Fig. 3, which illustrates the appearance of the parts before being assembled.

In Fig. 4 the parts 4$^a$ and 4$^b$ are shown as having been secured together to form a complete wiping element, in which case the projections 20 of one part are in locking engagement with the notches of the other part by reason of the dovetail form of the projections 20. The complete wiping element 4 is illustrated as having been partly applied to the tubular section 13$^a$ of the holder, the interlaced projections 20 being received through the slot 18. When the interlocking projections 20 are so received in the holder, it is apparent that the remaining plane portions of the parts 4$^a$ and 4$^b$ of the wiping element extend divergently from the holder.

The wiping element 4 is shown as having been completely applied to the holder in Figs. 1 and 2, in which position the smooth edges 21 of the parts 4$^a$ and 4$^b$ are in engagement with the face of the windshield glass. The spacing of the rod 6 away from the windshield glass is such that when the holder, with the wiping element attached thereto, is secured in the portion 12 by the set screw 14, the divergent portions of the element 4 are further spread apart by flexure thereof, as clearly shown in Fig. 8, in which position the edges 21 cling closely to the surface of the glass. Consequently, when the shaft 2 is oscillated by the mechanism within the casing 1, the wiping element 4 will move back and forth in close contact with the glass and effectively remove snow, rain, or other similar matter therefrom.

From the foregoing it is apparent that by my invention I have provided an improved form of wiping element for windshield cleaners which does not materially interfere with the vision of the operator of a vehicle, even when moving back and forth, by reason of the fact that it is composed of transparent material. My improved wiping element is also characterized by its extremely simple and inexpensive construction and the fact that it can be applied to, or removed from its holder. As the wiping element is in the form of two flat strips before assembly, the parts can be packed for shipment in a very small space.

A still further advantage obtained by my invention lies in the fact that the holder for the wiping element is adjustable in length. This adjustment permits the purchaser of my improved device to employ a wiping element of a length best suited for the proportions of his windshield, for there is considerable variation in the height of windshield frames with respect to the level of the driver's eyes. The parts of the wiping element can be manufactured and sold with a length equal to the maximum length of the holder, and it is obviously an easy matter for the purchaser to cut the parts of the wiping element to the desired length and then adjust the overall length of the holder sections 13$^a$ and 13$^b$.

I claim:

1. A windshield wiping element comprising substantially similar parts, each part having one side bounded by a straight line, and the other side comprising alternating projecting and recessed portions, the projecting portions having a dimension parallel to said straight line that is greater than the inside base of said projecting portions, whereby the projecting and recessed portions are interlockingly held together.

2. A windshield wiping element comprising similar wiper strips having a series of interlocking portions longitudinally disposed along said strips and a holder for receiving said interlocking portions, with the strips disposed at an angle to each other.

3. A windshield wiping element comprising similar wiper strips having a series of interlocking portions longitudinally disposed along said strips, and a tubular holder having a longitudinal slot for receiving said interlocking portions, the said interlocking portions and the holder cooperating to maintain the wiper strips in divergent relationship against the surface to be wiped.

RALPH G. AREY.